United States Patent [19]

Corey et al.

[11] Patent Number: 4,832,122
[45] Date of Patent: May 23, 1989

[54] IN-SITU REMEDIATION SYSTEM AND METHOD FOR CONTAMINATED GROUNDWATER

[75] Inventors: John C. Corey; Brian B. Looney; Dawn S. Kaback, all of Aiken, S.C.

[73] Assignee: The United States of America as represented by the United States Department of Energy, Washington, D.C.

[21] Appl. No.: 236,438

[22] Filed: Aug. 25, 1988

[51] Int. Cl.⁴ .................. E21B 36/00; E21B 43/00; E21B 43/40
[52] U.S. Cl. .................................. 166/266; 166/50; 166/52; 166/272
[58] Field of Search ............... 166/272, 266, 267, 268, 166/50, 52, 57, 303

[56] References Cited

U.S. PATENT DOCUMENTS

| | | | |
|---|---|---|---|
| 3,960,213 | 6/1976 | Striegler et al. | 166/50 X |
| 4,022,279 | 5/1977 | Driver | 166/272 X |
| 4,114,688 | 9/1978 | Terry | 166/266 X |
| 4,303,127 | 12/1981 | Freel et al. | 166/266 |
| 4,323,122 | 4/1982 | Knopik | 166/369 X |
| 4,442,901 | 4/1984 | Zison | 166/50 X |
| 4,466,485 | 5/1984 | Shu | 166/50 X |
| 4,593,760 | 6/1986 | Visser et al. | 166/267 |
| 4,660,639 | 4/1987 | Visser et al. | 166/267 |
| 4,682,652 | 7/1987 | Huang et al. | 166/50 X |

OTHER PUBLICATIONS

Dickinson et al., "Radial Wells and Hazardous Waste Sites", *RCRA Site Remediation*, pp. 232–237.

*Primary Examiner*—Stephen J. Novosad
*Attorney, Agent, or Firm*—Allen F. Westerdahl; William R. Moser

[57] ABSTRACT

A system for removing volatile contaminants from a subsurface plume of contamination comprising two sets of wells, a well for injecting a fluid into a saturated zone on one side of the plume and an extracting well for collecting the fluid together with volatilized contaminants from the plume on the other side of the plume. The fluid enables the volatile contaminants to be volatilized and carried therewith through the ground to the extracting well. Injecting and extracting wells are preferably horizontal wells positioned below the plume in the saturated zone and above the plume in the vadose zone, respectively. The fluid may be air or other gas or a gas and liquid mixture depending on the type of contaminant to be removed and may be preheated to facilitate volatilization. Treatment of the volatilized contamination may be by filtration, incineration, atmospheric dispersion or the like.

21 Claims, 3 Drawing Sheets

IN-SITU REMEDIATION SYSTEM AND METHOD FOR CONTAMINATED GROUNDWATER

The United States Government has rights in this invention pursuant to Contract No. DE-AC09-76SR00001 between the U.S. Department of Energy and E. I. DuPont de Nemours & Co.

BACKGROUND OF THE INVENTION

1. Field of the Invention and Contract Statement

The invention relates to a system for in-situ remediation of contaminated ground water.

2. Discussion of Background and Prior Art

Contaminated groundwater poses a serious health problem when used as a source of water for drinking or for growing crops and vegetation. Additionally, the cost of containing and decontaminating groundwater can be high.

The most direct methods of removing contamination from groundwater and soils are by excavating contaminated subsurface materials, such as soils, sediments, fractured rock, and the like, and by pumping contaminated water from subsurface materials to the surface of the earth for treatment. Both excavating and pumping, although direct methods of dealing with contaminated groundwater, are expensive.

Recently, methods for drilling horizontal wells have been developed. In "Radial Wells and Hazardous Waste Sites", Wade Dickinson, R. Wayne Dickinson and Peter A. Mote, describe a method for drilling of horizontal wells in detail and also note the potential use of horizontal wells for remediation of contaminated groundwater. Wells placed into the contaminated area may be used for extraction of contaminated groundwater or to inject various treatment substances.

Related U.S. Pat. Nos. 4,593,760 and 4,660,639 describe a method by Visser, et al., for removing volatile contaminants from the upper, unsaturated or "vadose" zone of the groundwater. Wells sunk vertically into the vadose zone may have a casing consisting of two sections, an upper unperforated region and a lower perforated region. Volatile contaminants in the vadose zone enter the perforated casing and are pumped past the unperforated casing to the earth's surface for treatment.

The prior art generally comprises passive rather than active systems for collection of contamination and systems operating only in the vadose zone rather than systems operating in both the saturated and vadose zones. Although injection of treatment substances for in-situ treatment has been conceptualized by the prior art, the effectiveness of treatment through injection is unknown without substantial post-injection sampling.

None of the prior art remediation methods comprises the use of horizontal wells for saturated zone injection of fluids that volatilize contaminants and extraction of those volatilized contaminants to remediate contaminated groundwater.

SUMMARY OF THE INVENTION

It is an object of the present invention to provide a system and method for cleansing contaminated groundwater.

It is a further object of the present invention to provide a system and method for stripping volatile contamination from groundwater.

It is a further object of the present invention to provide a system and method for in-situ treatment of groundwater contaminated by volatile compounds.

It is a further object of the present invention to provide a system and method for limiting the advance of a plume of contamination in groundwater.

To achieve the foregoing and other objects and in accordance with the purpose of the invention, as embodied and broadly described herein, the invention comprises two well systems spaced apart, one system injecting a fluid, the other system extracting the fluid. The fluid is preferably a gas, a gas mixture, or a liquid carried by a gas. In the groundwater between the two systems is a plume of contaminants having a preference for the gaseous phase. The injecting well system is connected to a source of fluid for injecting and a pump. The extracting well, if present, may vent the removed gases to the atmosphere or may be connected to a treatment device, such as activated carbon filter, incinerator, an off-gas stack or the like.

The pumps drive the fluid through the injection well system, across the contamination plume so that the contaminants volatilize. The fluid bearing the volatilized contaminants then flows into the extraction well system and is pumped into the treatment device. After the treatment device separates the contaminants from the fluid, the fluid may be recycled to the injection well or dispersed into the atmosphere. The contaminants are treated in one of a variety of ways to render them harmless or are released in a controlled fashion into the atmosphere.

In a preferred embodiment, the injection well system is a horizontal well positioned below the contaminated plume in the saturated zone, below the water table; the extraction well system, also preferably a horizontal well but possibly a series of vertical wells, is positioned above the contamination plume in the vadose zone. The geology of the area, fluid flow rates and size of the plume dictate the relative orientation and separation of the two well systems with respect to each other.

The particular type of fluid, and any additional substance carried by it into the plume, would depend on the type of contamination. Air may be the most economical fluid for large plumes. Steam may be used to facilitate volatilization by providing heat energy. Reactants, such as bicarbonate, which react with the groundwater to form purging gases, may also be used.

Reference is now made in detail to the present preferred embodiment of the invention, an example of which is illustrated in the accompanying drawings.

A BRIEF DESCRIPTION OF THE DRAWINGS

The accompanying drawings, which are incorporated in and form a part of the specification, illustrate the invention and, together with the description, serve to explain the principles of the invention.

DETAILED DESCRIPTION OF THE INVENTION

The present invention is an in-situ apparatus and method for removing contamination from groundwater. The invention in the preferred embodiment employs a horizontal well positioned in the saturated zone below a plume of contamination as a means of injecting a fluid into the plume effectively. The fluid may be a gas, such as air, oxygen, air and oxygen, or a fluid carried by a gas, such as water vapor and air, and may be heated to facilitate volatilization of contaminants.

If the contamination is a compound having a preference for the gaseous phase, volatilizing the contamination urges it upwardly in the saturated zone. A second well system is used to extract and collect the volatilized contaminants from the unsaturated zone for further treatment.

Figure 1:
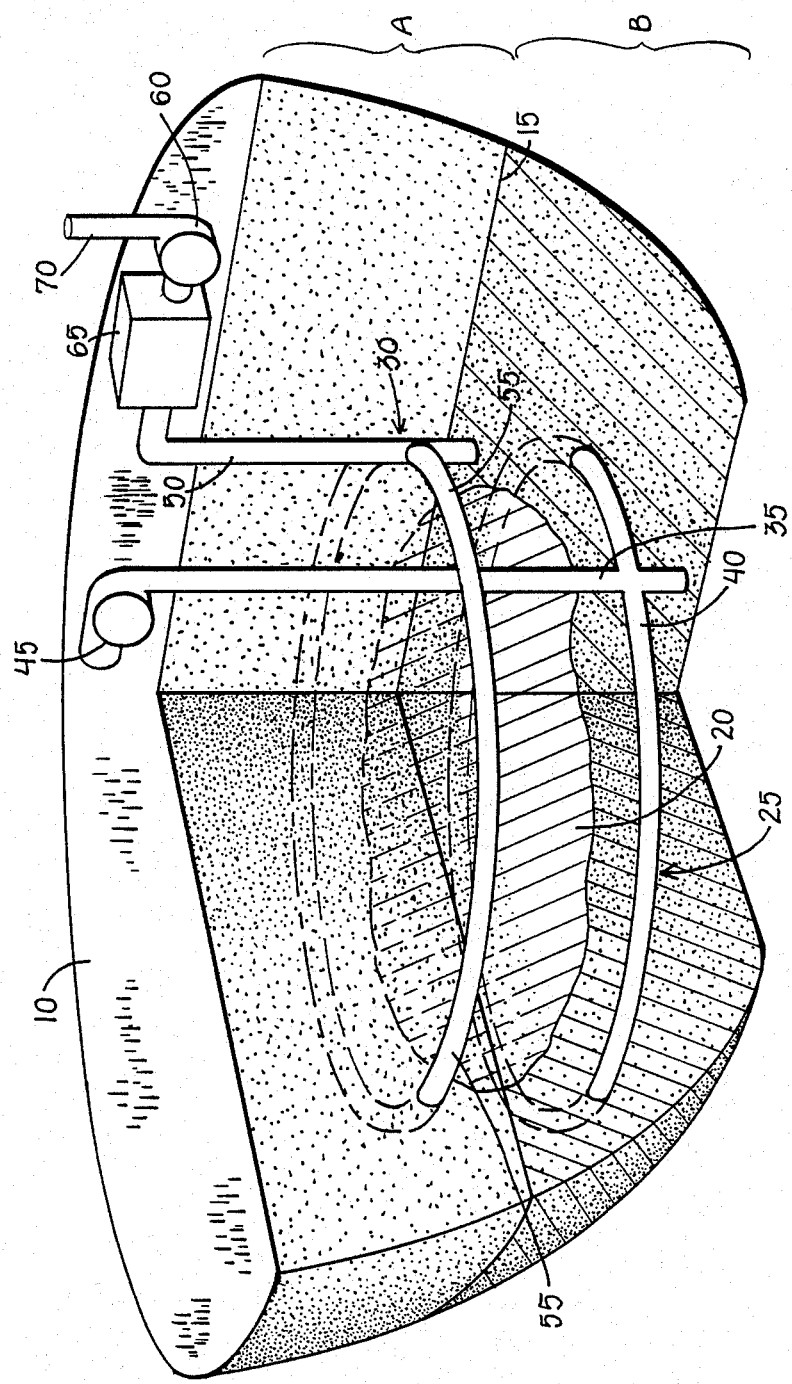
FIG. 1 is a perspective, partial cross-sectional view of an embodiment of the remediation system of the invention.

Referring to FIG. 1, which shows a partial cross section of the earth's surface 10 and underlying soil structure, a preferred embodiment is disclosed for volatilizing and extracting contaminants using two horizontal well systems. The soil structure exists as an upper, vadose, or unsaturated zone, indicated generally at A, and a lower, saturated zone, indicated generally at B. These two zones meet at the water table 15.

Below surface 10 is a plume 20 of contamination. Part of plume 20 is in vadose zone A and part is in saturated zone B. Plume 20 can be wholly in either vadose zone A or saturated zone B.

Below plume 20 in saturated zone B is an injection well system 25 and above plume 20 in vadose zone A is an extraction well system 30. Injection well system 25 comprises a first vertical shaft 35, a first horizontal shaft 40 and a first pump 45. Extraction well system 30 comprises a second vertical well shaft 50, a second horizontal shaft 55 and a second pump 60. Second pump 60 is further connected to a treatment device 65 and an off-gas stack 70.

Figure 2:
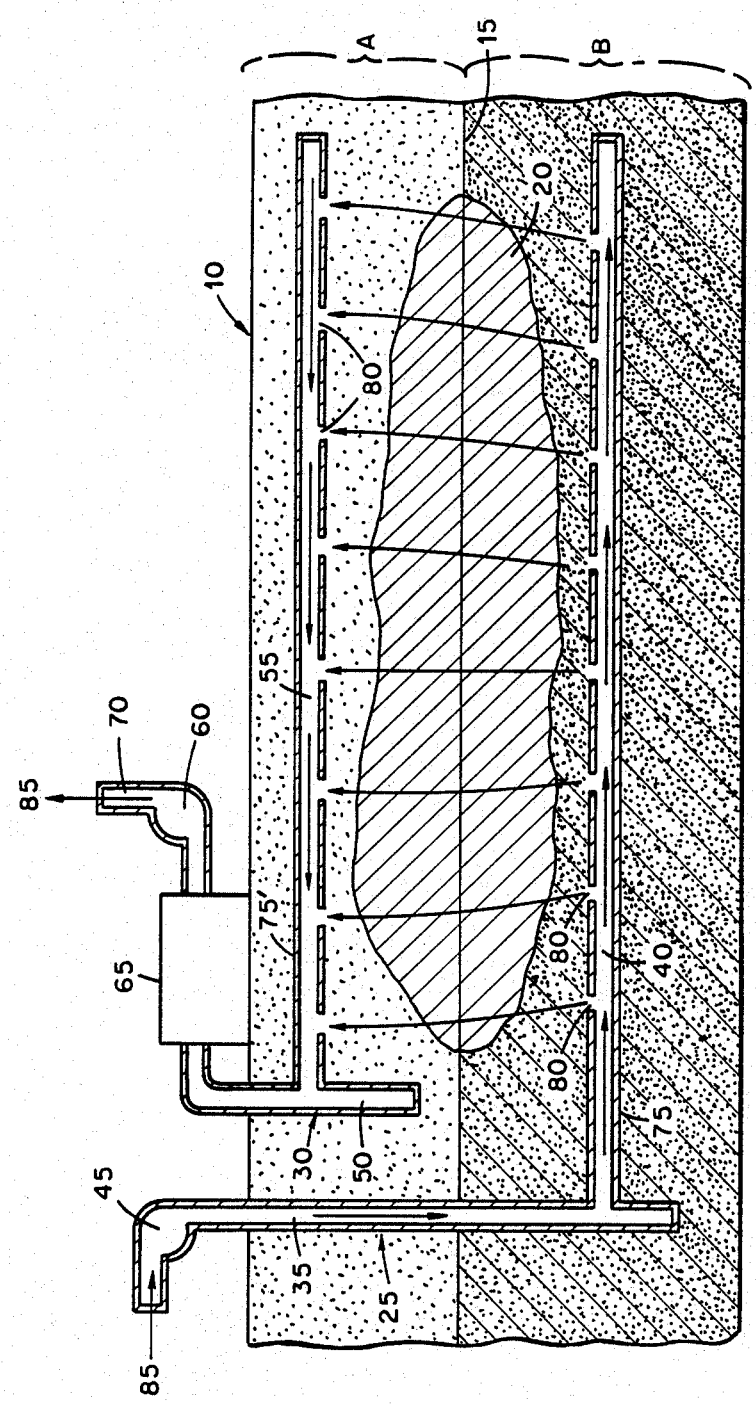
FIG. 2 is a detailed cross-sectional side view of an embodiment of the remediation system of the invention showing horizontal injection and extraction well systems.

As best seen in FIG. 2 first and second horizontal shafts 40, 55 have casings 75, 75', respectively, with multiple apertures 80, such as slots or perforations. The slots or perforations must be narrow enough to keep soil particles from blocking the movement of a fluid 85, with and without volatilized contaminants, from crossing casings 75, 75', but large enough and numerous enough to allow fluid 85 to cross freely.

Fluid 85 is pumped into injection well system 25 by first pump 45. Fluid 85 follows first vertical shaft 35 to first horizontal shaft 40. Fluid 85 then exits casing 75 through apertures 80 into saturated zone B. Fluid 85 then enters plume 20 wherein the volatile contaminants volatilize and are carried by fluid 85 to second horizontal shaft 55, crossing into casing 75' through apertures 80.

Fluid 85 carrying volatilized organic contaminants follows second horizontal shaft 55 to second vertical shaft 50 of the extraction well system 30, drawn by second pump 60. At surface 10, fluid 85 carrying volatilized contaminants enters treatment device 65 where fluid 85 is separated from the contaminants and vented by off-gas stack 70.

A saturated zone plume tends to spread laterally making vertical wells impractical and horizontal wells ideal for influencing a substantial portion of the plume. Horizontal wells can be established to conform to the particular plume of contamination.

It is not necessary for the present invention that first and second horizontal shafts 40, 55 be circular, elliptical or closed in another particular shape, or that injection and extraction well systems 25, 30 have the same general configuration as each other or be vertically stacked. The configuration is dictated by the size and shape of plume 20, drilling economics and the subsurface geology.

For example, horizontal, radial "spokes" emanating from a vertical shaft or a single horizontal shaft branching from a vertical shaft may be best for some applications, such as containment of a plume along a boundary.

If water table 15 is too high for extraction well system 30 to be installed in place above plume 20, or fluid 85, as a gas, may remain in vadose zone A, extraction well system 30 may be dispensed with. To collect volatilized contaminants, surface 10 may be covered with a fluid-impervious material and the volatilized contaminants extracted from between the impervious material and surface 10.

The orientation of the injection well system 25 and extraction well system 30 with respect to each other is determined by the subsurface geology and the flow rate of the fluid. Impermeable soils tend to cause the injected fluid to spread more in a direction perpendicular to the line between lower horizontal shaft 40 and upper horizontal shaft 55. A more rapidly spreading plume would require extraction well system 30 to extend over a broader area than injection well system 25. For porous soils, extraction wells in the vadose zone have been shown to have a zone of influence up to 200 feet.

It is important that injection well system 25 provide a sufficiently dispersing source of the fluid so as to influence a substantial portion of plume 20 and that extraction well system 25 provide a sufficiently collective sink for the volatilized contaminants with plume 20 generally between the wells. It is also important that the flow of fluid 85 from lower horizontal shaft 40 to upper horizontal shaft 55 fully encompasses plume 20 plus so much of the adjacent ground into which plume 20 would be expected to spread during the operation of the in-situ remediation system.

The process can be applied to volatile organic contaminants such as trichloroethylene, tetrachloroethylene, gasoline hydrocarbons, benzene and other chemicals having an affinity for the gaseous versus the liquid phase because of a relatively higher vapor pressure, a lower solubility or both.

The extracted fluid carrying the contaminants can be purified to separate and treat the contaminants. The purified fluid may be released to the atmosphere or recycled to injection well system 25.

Figure 3:
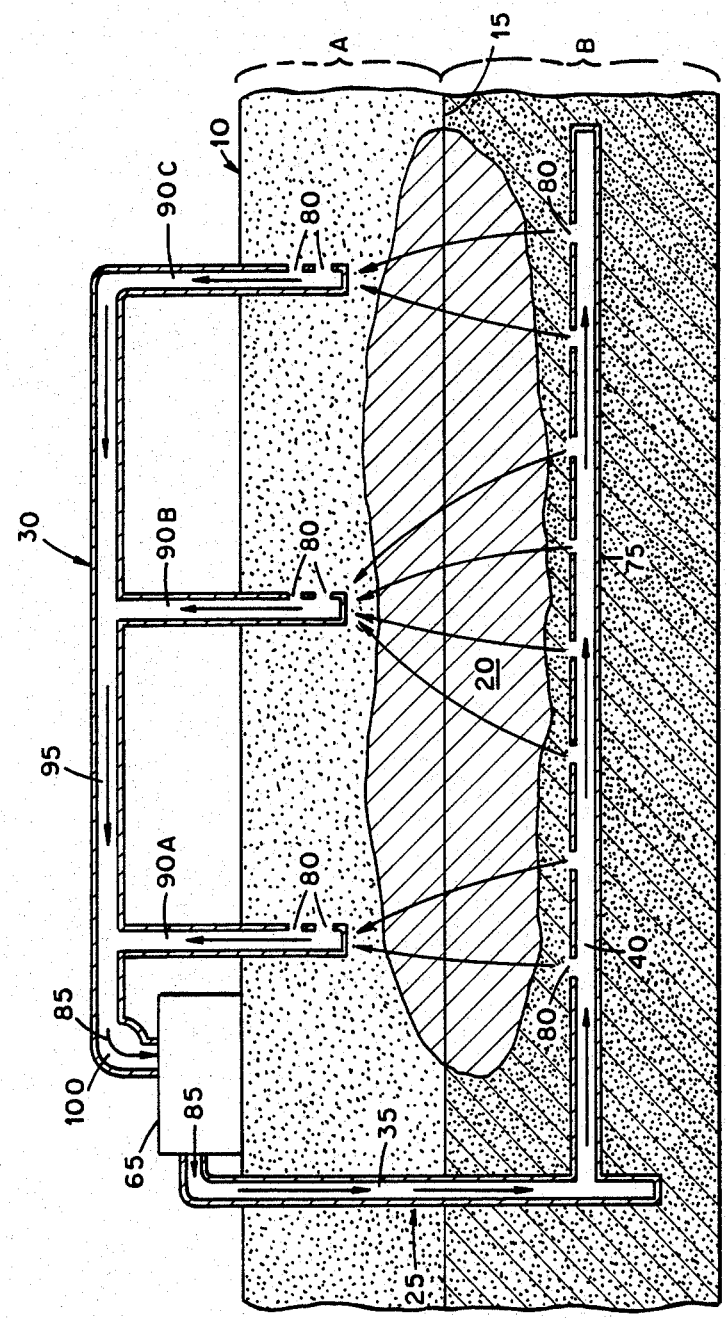
FIG. 3 is a detailed cross-sectional side view of an alternate embodiment of the remediation system showing a horizontal injection and vertical extraction well system.

As best shown in FIG. 3, extraction well system can be a series of vertical shafts 90 interconnected by piping 95 to pump 100 and treatment device 65. Pump 100 may replace first and second pumps 45 and 60 in the preferred embodiment described above if fluid 85 is recycled to injection well system 25.

Purification by treatment device 65 may be accomplished by any well known technique, such as activated carbon filtration or incineration. Alternatively, a contaminant may be dispersed to the atmosphere in a controlled fashion.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A system for in-situ decontamination of groundwater carrying contaminants in a generally horizontal plume partially or wholly located below a water table in a saturated zone under a portion of the surface of the earth, said contaminants having an affinity for a gaseous phase, said system comprising
   a fluid means capable of volatilizing said contaminants to said gaseous phase;
   a means for injecting said fluid means below said water table on one side of said plume; and
   a means for extracting said fluid, said extracting means spaced apart from said injecting means and positioned on an opposing side of said plume to draw said fluid across said plume thereby enabling said contaminants to be volatilized to said gaseous phase and to be extracted with said fluid.

2. A system for in-situ decontamination of groundwater carrying contaminants in a generally horizontal plume partially or wholly located below a water table in a saturated zone under a portion of the surface of the earth, said contaminants having an affinity for a gaseous phase, said system comprising
   a fluid means capable of volatilizing said contaminants to said gaseous phase;
   an injecting well means for injecting said fluid means below said water table on one side of said plume, said injecting well means having a pump and at least one shaft;
   an extracting well means for extracting said fluid means, said extracting well means spaced apart from said injecting well means and positioned on an opposing side of said plume so that said extracting well means draws said fluid means across said plume from said first well means thereby enabling said contaminants to volatilize to said gaseous phase and to be extracted with said fluid means, said extracting well means having a pump and at least one shaft; and
   a treatment means operatively connected to said extracting well means so that said treatment means receives said fluid means and said volatilized groundwater contaminants for treatment.

3. The system of claim 2 wherein said injecting well means further comprises a vertical shaft and at least one horizontal shaft, said at least one horizontal shaft comprising a casing with a multiplicity of apertures through which apertures said fluid means may pass.

4. The system of claim 3 wherein said at least one horizontal shaft of said injecting well means is positioned below said plume.

5. The system of claim 4 wherein said at least one horizontal shaft of said injecting well means is positioned below said plume in a saturated zone.

6. The system of claim 2 wherein said extracting well means further comprises a vertical shaft and at least one horizontal shaft, said at least one horizontal shaft comprising a casing having a multiplicity of apertures through which said fluid means and said volatilized contaminants can pass into said casing.

7. The system of claim 6 wherein said at least one horizontal shaft of said extracting well means is positioned above said plume in a vadose zone.

8. The system of claim 2 wherein said extracting well means further comprises at least one vertical shaft, said at least one vertical shaft comprising a casing with a multiplicity of apertures through which said fluid means and said volatilized contaminants can pass into said casing.

9. The system of claim 2 wherein said fluid means is selected from the group comprising air, oxygen, air and oxygen, air and water vapor.

10. The system of claim 2 wherein said fluid means is heated before injecting.

11. The system of claim 2 wherein said treatment means is an incinerator.

12. The system of claim 2 wherein said treatment means is an activated charcoal filter.

13. The system of claim 2 wherein said treatment means is controlled atmospheric dispersion.

14. The system of claim 2 further comprising a means for separating said fluid means from said volatilized contaminants and recirculating said fluid means from said separating means to said injecting well means.

15. A process for in-situ decontamination of groundwater carrying volatile contaminants having an affinity for a gaseous phase, said contaminants being in the form of a subsurface plume, said process comprising the steps of
   pumping a fluid capable of volatilizing said contaminants into a saturated zone proximate to said plume;
   drawing said fluid across said plume so that said contaminants volatilize and can be carried with said fluid;
   pumping said fluid and said contaminants from said plume into a vadose zone;
   collecting said fluid and said contaminants;
   separating said fluid from said contaminants; and
   treating said contaminants.

16. A process for in-situ decontamination of groundwater carrying volatile contaminants having an affinity for a gaseous phase, said contaminants being in the form of a subsurface plume, said process comprising the steps of
   constructing a horizontal injection well system on one side of said plume;
   constructing a horizontal extraction well system spaced apart from said horizontal injection well system on an opposing side of said plume;
   injecting a fluid capable of volatilizing said contaminants into said injection well system;
   drawing said fluid across said plume so that said contaminants volatilize;
   extracting said fluid and said volatilized contaminants from said extraction well;
   separating said fluid from said volatilized groundwater contaminant; and
   treating said separated ground water contaminants.

17. The process of claim 16 further comprising the steps of recirculating said separated fluid to said horizontal injection well system.

18. The process of claim 16 wherein the step of treating said separated volatilized contaminants is by means of incineration.

19. The process of claim 16 wherein the step of treating said separated volatilized contaminants is by means of filtering through activated charcoal.

20. The process of claim 16 wherein the step of treating said separated volatilized contaminants is by means of controlled atmospheric dispersion.

21. The process of claim 16 further comprising the step of heating said fluid before injecting.

* * * * *